United States Patent
Chou et al.

(10) Patent No.: US 9,607,791 B2
(45) Date of Patent: Mar. 28, 2017

(54) OPERATING DEVICE AND ELECTRONIC DEVICE USING THE SAME

(71) Applicant: ABILITY ENTERPRISE CO., LTD., New Taipei (TW)

(72) Inventors: Chi-Wen Chou, New Taipei (TW); Chien-Wei Chiang, New Taipei (TW); Wei-Chun Lin, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 130 days.

(21) Appl. No.: 14/144,978

(22) Filed: Dec. 31, 2013

(65) Prior Publication Data

US 2014/0190805 A1    Jul. 10, 2014

(30) Foreign Application Priority Data

Jan. 10, 2013    (TW) .............................. 102100982 A

(51) Int. Cl.
*H01H 15/02* (2006.01)
*H01H 15/10* (2006.01)
*H01H 15/24* (2006.01)
*G03B 17/02* (2006.01)

(52) U.S. Cl.
CPC ............ *H01H 15/10* (2013.01); *H01H 15/24* (2013.01); *G03B 17/02* (2013.01); *G03B 2217/002* (2013.01); *H01H 2221/014* (2013.01)

(58) Field of Classification Search
CPC ...... H01H 15/10; H01H 15/005; H01H 15/02; H01H 15/24; H01H 2221/014

USPC ................... 200/547, 332.1, 536, 16 C, 252
See application file for complete search history.

(56) References Cited

U.S. PATENT DOCUMENTS

| | | | |
|---|---|---|---|
| 6,841,744 B1 * | 1/2005 | Kodo ................... | H01H 15/02 200/16 C |
| 2007/0074966 A1 | 4/2007 | Yamamoto et al. | |
| 2007/0249198 A1 | 10/2007 | Nakase et al. | |
| 2010/0108483 A1 * | 5/2010 | Zuo ............................ | 200/332.1 |
| 2011/0017579 A1 | 1/2011 | Ogura | |
| 2011/0070929 A1 | 3/2011 | Li | |
| 2013/0140161 A1 * | 6/2013 | Gao ............................ | 200/318 |

FOREIGN PATENT DOCUMENTS

| | | |
|---|---|---|
| CN | 1448972 A | 10/2003 |
| CN | 1929062 A | 3/2007 |
| CN | 201025746 Y | 2/2008 |
| CN | 101911233 A | 12/2010 |
| CN | 102025806 A | 4/2011 |
| JP | 03-236006 A | 10/1991 |

(Continued)

OTHER PUBLICATIONS

Chinese Office Action dated Sep. 5, 2016.
Taiwanese Office Action dated May 18, 2016.

*Primary Examiner* — Renee Luebke
*Assistant Examiner* — Ahmed Saeed
(74) *Attorney, Agent, or Firm* — Rabin & Berdo, P.C.

(57) ABSTRACT

An operating device and an electronic device using the same are provided. The operating device includes a base, an electronic circuit board, a lever and a slider. The base includes a bearer. The electronic circuit board is disposed on the base. The lever is disposed on the electronic circuit board. The slider is movably disposed on the sliding portion for triggering the lever.

15 Claims, 7 Drawing Sheets

(56) References Cited

FOREIGN PATENT DOCUMENTS

| TW | M303477 U | 12/2006 |
|---|---|---|
| TW | 201019361 A | 5/2010 |
| TW | 201229721 A | 7/2012 |

\* cited by examiner

OPERATING DEVICE AND ELECTRONIC DEVICE USING THE SAME

This application claims the benefit of Taiwan application Serial No. 102100982, filed Jan. 10, 2013, the subject matter of which is incorporated herein by reference.

BACKGROUND OF THE INVENTION

Field of the Invention

The invention relates in general to an operating device and an electronic device using the same, and more particularly to an operating device triggering a related linked-device through movement and an electronic device using the same.

Description of the Related Art

Conventional operating device comprises a base, an electronic circuit board, a shaft, an elastic member, a lever and a dial button. The base has an open hole, wherein the dial button, the electronic circuit board, the shaft, and the elastic member are all disposed inside the open hole. The dial button is exposed to an operation portion for the user to operate with his/her finger. The shaft passes through the dial button and the base, so that the dial button can rotate with respect to the base. The elastic member connects the dial button and the base, and provides an elastic force when the dial button rotates relatively. The elastic member, the shaft and the electronic circuit board are all disposed right under the dial button. The lever is disposed on the electronic circuit board. The dial button has a Y-shaped recess. When the dial button rotates with respect to the base, a sidewall of the Y-shaped recess triggers the lever of the electronic circuit board so that the electronic circuit board performs the corresponding function accordingly.

Since the electronic circuit board, the elastic member, the shaft and the dial button are vertically staked on the base and many assembly parts need to be assembled, a large space is required, making the assembly and maintenance of the operating device become difficult.

SUMMARY OF THE INVENTION

The invention is directed to an operating device and an electronic device using the same. Through the structural design and assembly of the elements of the operating device of the invention, the overall thickness of the operating device is reduced, and the operating device is enhanced assembly and convenient to maintain.

According to one embodiment of the present invention, an operating device and an electronic device using the same are provided. The operating device comprises a base, an electronic printed board, a lever and a slider. The base comprises a bearer. The electronic printed board is disposed on the base. The lever is disposed on the electronic printed board. The slider is movably disposed on the bearer for triggering the lever.

According to another embodiment of the present invention, an electronic device is provided. The electronic device comprises an operating device. The operating device comprises a base, an electronic circuit board, a lever and a slider. The base comprises a bearer. The lever is disposed on the electronic circuit board. The slider is movably disposed on the bearer for triggering the lever.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
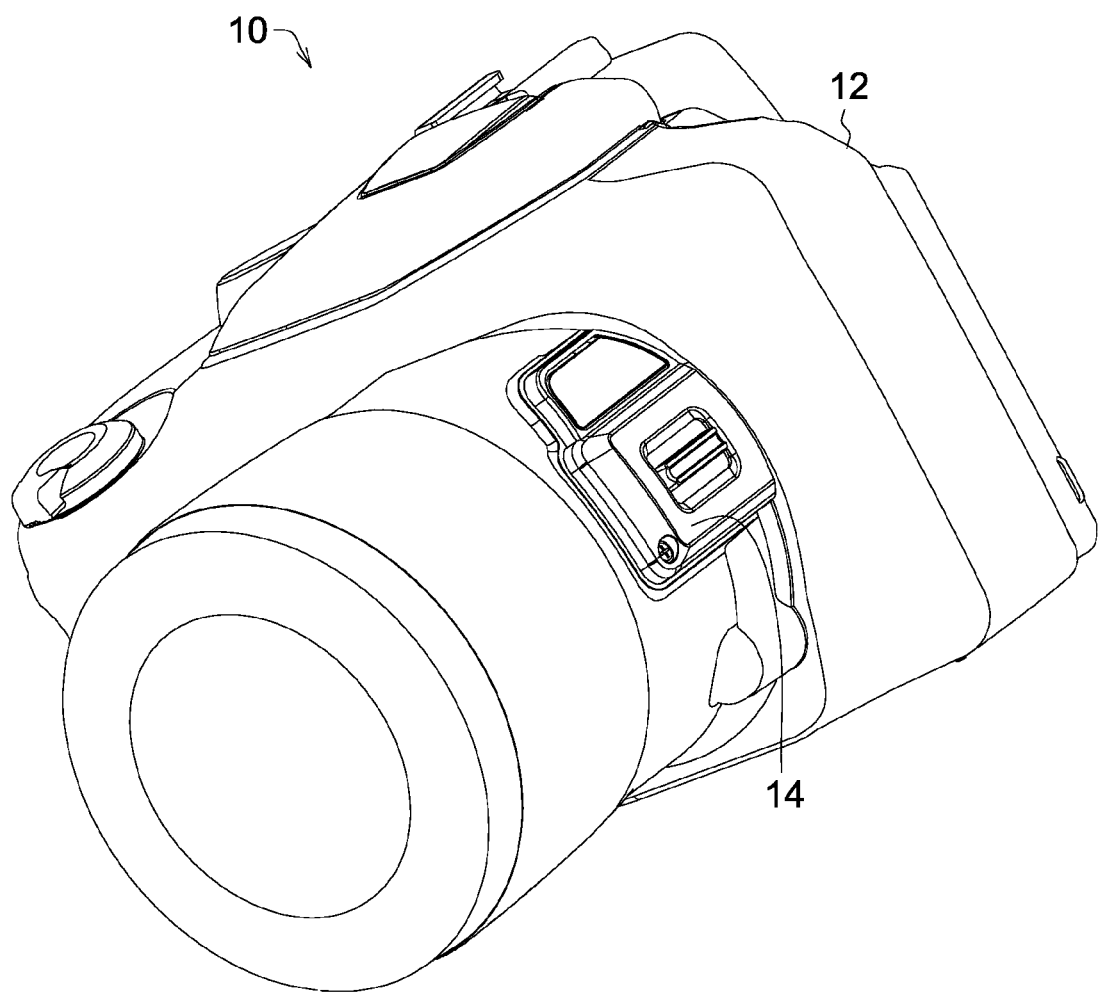
FIG. 1 is an external view of an electronic device according to an embodiment of the invention.

Referring to FIG. 1, an appearance diagram of an electronic device according to an embodiment of the invention is shown. The electronic device 10 can be realized by a system with image capturing function such as a digital camera, digital video recorder, a personal digital assistant (PDA), a notebook computer or any type of image capturing device; however, such exemplification is not meant to be for limiting.

The electronic device 10 comprises a body 12 and an operating device 14. The operating device 14 is disposed on the body 12. In an embodiment, the operating device 14 can control zooming in or zooming out during the zooming process. The operating device 14 can be used to control other functions of the electronic device 10, and the invention is not limited thereto.

Figure 2:
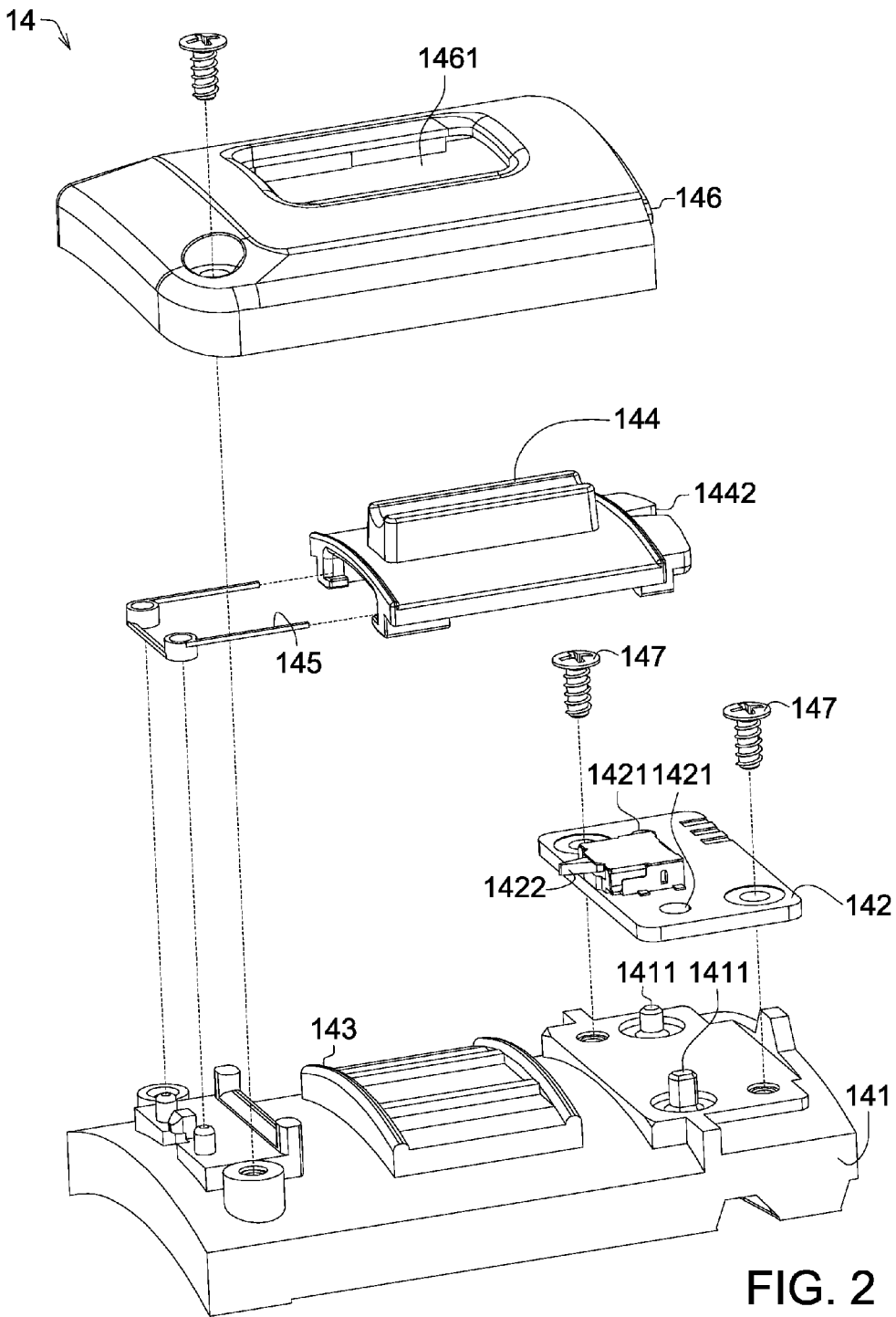
FIG. 2 is an explosion view of the operating device of FIG. 1.

Referring to FIG. 2, an explosion view of the operating device of FIG. 1 is shown. The operating device 14 comprises a base 141, an electronic circuit board 142, a lever 1422, a slider 144, a first elastic member 145 and a cover 146. In the present example, the base 141 is a portion of the body 12. In another example, the base 141 and the body 12 are two individual elements, wherein the base 141 and other elements form the operating device 14 and to be assembled onto the body 12 together.

Figure 3:
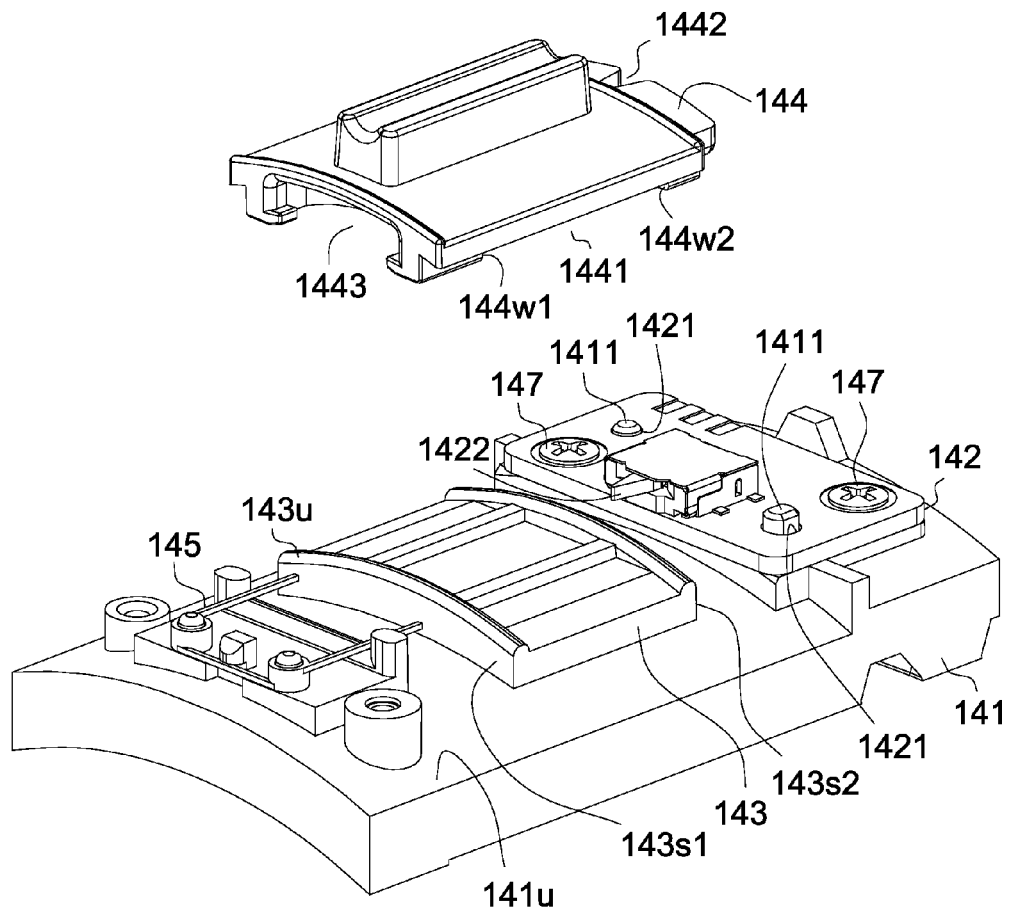
FIG. 3 is an assembly diagram of the base and the electronic circuit board of FIG. 2.

FIG. 3 is an assembly diagram of the base and the electronic circuit board of FIG. 2. Referring to both FIG. 2 and FIG. 3, the electronic circuit board 142 is disposed on the base 141. In the present embodiment of the invention, the electronic circuit board 142 is disposed on a surface 141u of the base 141. In the present embodiment, the electronic circuit board 142 is exposed out the base 141, so that the electronic circuit board 142 and the base 141 can be conveniently assembled to each other, and accordingly assembly of the electronic circuit board 142 and the base 141 can be promoted.

In an embodiment, the base 141 comprises two positioning columns 1411, the electronic circuit board 142 comprises two positioning holes 1421, and the electronic circuit board 142 is positioned on the two positioning columns 1411 of the base 141 through two positioning holes 1421. In another embodiment, the electronic circuit board 142 is fixed on the base 141 through a screw 147. However, the electronic circuit board 142 can be engaged with the positioning columns 1411 of the base 141 through the positioning holes 1421 so as to be fixed on the base 141; under such design, the screw 147 can be omitted.

Furthermore, the base 141 further comprises a bearer 143 disposed on the surface 141u of the base 141. The slider 144 is movably disposed on the bearer 143 for triggering the lever 1422. In an embodiment, the bearer 143 can be protruded and further exposed from the base 141 to benefit the assembly of the slider 144 and the bearer 143.

The bearer 143 has a first side 143s1 and a second side 143s2 opposite to the first side. The slider 144 comprises a groove 1441. The slider 144 is disposed on the bearer 143. The slider 144 moves on the bearer 143 through the groove 1441. To put it in greater details, the groove 1441 has a first groove sidewall 144w1 and a second groove sidewall 144w2 opposite to the first groove sidewall 144w1. As the first groove sidewall 144w1 and the second groove sidewall 144w2 of the groove 1441 move along the first side 143s1 and the second side 143s2 of the bearer 143 respectively, the slider 144 moves accordingly.

In practical application, the gap between the first groove sidewall 144w1 and the second groove sidewall 144w2 is substantially equivalent to or slightly larger than the gap between the first side 143s1 and the second side 143s2 to avoid an overlarge clearance between the slider 144 and the bearer 143, and accordingly prevent the slider 144 from wobbling when moving on the bearer 143.

In an embodiment, the electronic circuit board 142, the slider 144 and the first elastic member 145 can be exposed out the base 141. Besides, if the electronic circuit board 142, the slider 144 and the first elastic member 145 are disposed on the base 141 along an extending direction of the surface 141u of the substrate 141, the overall thickness of the operating device 14 will be reduced.

Figure 4:
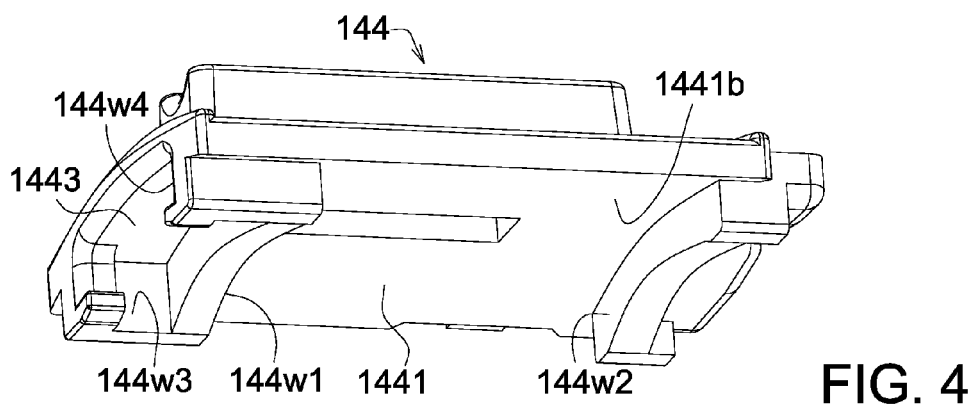
FIG. 4 is an external view of the slider of FIG. 3.
Figure 5:
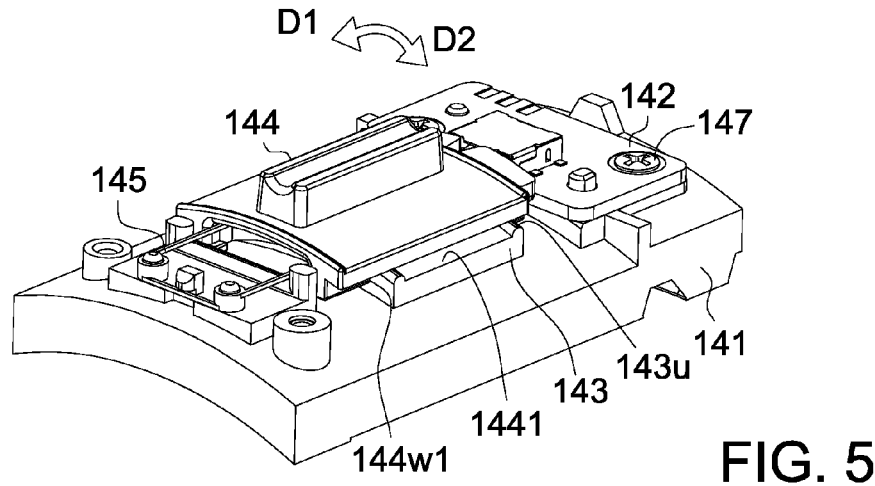
FIG. 5 is an external view of the slider disposed on a bearer FIG. 3.

FIG. 4 is an appearance diagram of the slider of FIG. 3. FIG. 5 is an external view of the slider disposed on a bearer of FIG. 3. Referring to both FIGS. 4 and 5, when the slider 144 is disposed on the bearer 143, the slider 144 can move along the first direction D1 or the second direction D2 through the groove 1441 on the bearer 143. In addition, the bearer 143 has a sliding surface 143u, and the slider 144 moves along the profile of the sliding surface 143u of the bearer 143.

In an embodiment, the profile of the sliding surface 143u is a curved surface, and therefore the first direction D1 and the second direction D2 are directions of the curved lines of the profile of the curved surface. Meanwhile, the shape of the slider 144 corresponds to that of the sliding surface 143u and thus is a curved shape.

In another example, the sliding surface 143u is a plane, and therefore the first direction D1 and the second direction D2 are linear directions. Meanwhile, a portion of the slider 144 has a shape, for example, a plane corresponding to that of the sliding surface 143u. However, the sliding surface 143u can have other shapes, and the shape of the slider 144 can be similar or identical to that of the sliding surface 143u, so that the slider 144 can move along the profile of the sliding surface 143u.

Figure 6:
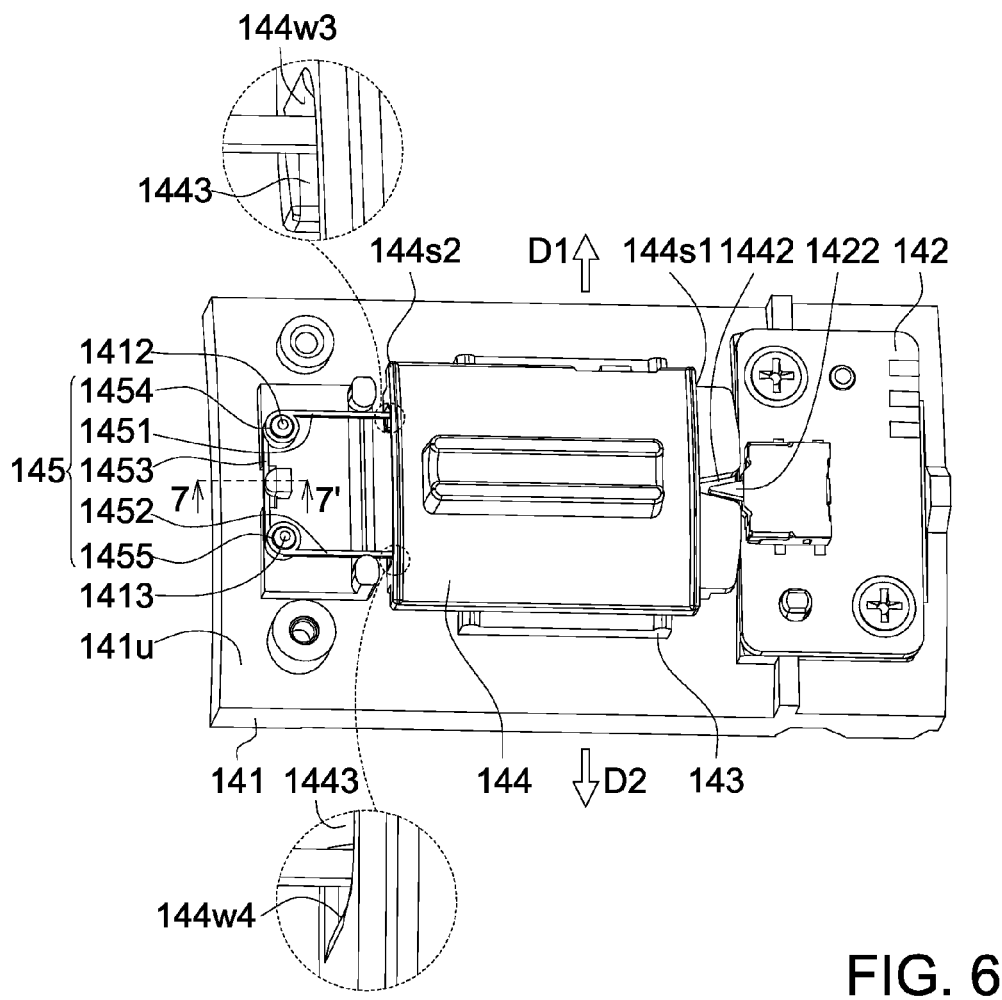
FIG. 6 is a top view of FIG. 5.

Referring to FIG. 6, a top view of FIG. 5 is shown. The lever 1422 is disposed on the electronic circuit board 142 and can be exposed out the base 141, wherein the lever 1422 can be formed by a flexible material such as rubber or plastics.

The lever 1422 can move on the bearer 143 through the slider 144. In an embodiment, the lever 1422 moves along the first direction D1 or the second direction D2 to perform a first function mode or a second function mode respectively. The first function mode can zoom in during the zooming process, and the second function mode can zoom out during the zooming process, but the invention is not limited thereto.

As indicated in FIG. 6, the lever 1422 may move with the slider 144. In detail, the slider 144 has a recess 1442, and the lever 1422 is extended to the recess 1442 to be within the recess 1442. When the slider 144 moves in the first direction D1, the sidewall of the recess 1442 drives the lever 1422 to move in the first direction D1 to perform the first function mode. When the slider 144 moves towards the second direction D2, the sidewall of the recess 1442 drives the lever 1422 to move in the second direction D2 to perform the second function mode. In an embodiment, the recess 1442 is V-shaped. In another example, the recess 1442 can be a portion of a circle, a portion of an ellipse or a polygon.

As indicated in FIG. 6, the sliding button 144 comprises a first side 144s1 and a second side 144s2 opposite to the first side 144s1. The lever 1422 is assembled on the first side 144s1 of the slider 144. The first elastic member 145 is connected to the slider 144 and is capable of pulling the slider 144 back to its initial position. The first elastic member 145 is disposed on the base 141 and is assembled on the second side 144s2 of the slider 144. To put it in greater detail, the first elastic member 145 is extended to the slider 144 from the second side 144s2 of the slider 144. When the slider 144 is moved and generates a shift, the first elastic member 145 will be pulled and deformed so as to generate an elastic potential energy. Therefore, when the slider 144 is released, the first elastic member 145, in order to release the elastic potential energy, will reverse the slider 144 back to its initial position. In the present example, when the slider 144 is located at its initial position, the lever 1422 is at a state which is not triggered.

In an embodiment, the first elastic member 145 comprises a first rod 1451, a second rod 1452 and a connection rod 1453. In the present example, the connection rod 1453 connects the first rod 1451 and the second rod 1452, so that the first rod 1451, the second rod 1452 and the connection rod 1453 form an inverted U-shaped rod. The slider 144 further has a receiving space 1443, and a portion of the first elastic member 145 is located inside the receiving space 1443. For instance, the first rod 1451 of the first elastic member 145 is located inside the receiving space 1443 and directly contacts a first inner sidewall 144w3 of the receiving space 1443, and the second rod 1452 of the first elastic member 145 is located inside the receiving space 1443 and directly contacts a second inner sidewall 144w4 of the receiving space 1443. As a result, when the slider 144 moves along the first direction D1, the second rod 1452 is driven by the second inner sidewall 144w4 to deform, and thus generate an elastic potential energy. When the slider 144 moves along the second direction D2, the first rod 1451 is driven by the first inner sidewall 144w3 to deform, and thus generate an elastic potential energy. When the external force is lifted so that the slider 144 is released, the first elastic member 145 immediately releases the elastic potential energy, which makes the slider 144 reverse to its initial position.

As indicated in FIG. 6, the first elastic member 145 comprises a hole group composed of a first hole 1454 and a second hole 1455. The base 141 comprises a pin group composed of a first pin 1412 and a second pin 1413. The first elastic member 145 is set onto the pin group via the hole group and is positioned on the base 141. To put it in greater detail, the first elastic member 145 has the ring-shaped first hole 1454 and the ring-shaped second hole 1455, wherein the first hole 1454 is located between the first rod 1451 and the connection rod 1453, and the second hole 1455 is located between the second rod 1452 and the connection rod 1453. In terms of the formation of the first elastic member 145, an elastic rod is wound to form the first hole 1454 and the second hole 1455, and then the elastic rod is bent towards the same direction to form the first rod 1451 and the second rod 1452 by using bending technology, so as to form the first elastic member 145.

Besides, the base 141 further has the first pin 1412 and the second pin 1413. The first elastic member 145 is set onto the first pin 1412 and the second pin 1413 of the base 141 by the first hole 1454 setting onto the first pin 1412 and the second hole 1455 setting onto the second pin 1413 to avoid the first elastic member 145 coming off the base 141.

Figure 7:
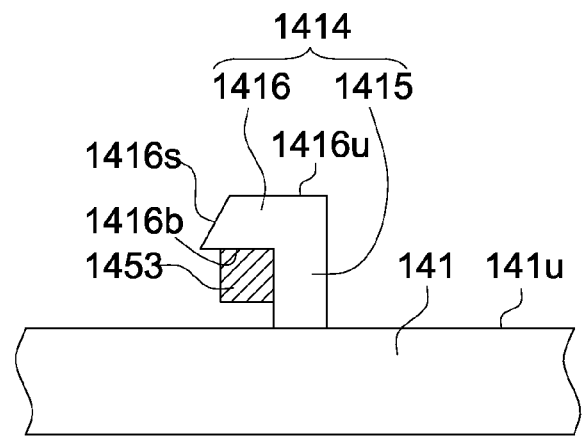
FIG. 7 is a cross-sectional view along a direction 7-7' of FIG. 6.

Referring to FIG. 7, a cross-sectional view along a direction 7-7' of FIG. 6 is shown. The base 141 comprises at least a hook 1414 engaged with the first elastic member 145. In an embodiment, the first elastic member 145 is engaged with the hook 1414 through the connection rod 1453. In addition, the hook 1414 has a vertical column 1415 and a horizontal beam 1416. The vertical column 1415 is protruded from the surface 141u of the base 141, and the horizontal beam 1416 is horizontally connected to the vertical column 1415 to form the hook 1414. The connection rod 1453 is engaged in the angular space between the vertical column 1415 and the horizontal beam 1416. The horizontal beam 1416 has a guiding bevel 1416s tilting outwards a lower surface 1416b of the horizontal beam 1416 from an upper surface 1416u of the horizontal beam 1416. In another embodiment, during the process of assembling the first elastic member 145 to the base 141, the connection rod 1453 can be easily engaged between the vertical column 1415 and the horizontal beam 1416 through the guiding of the guiding bevel 1416s.

Figure 8:
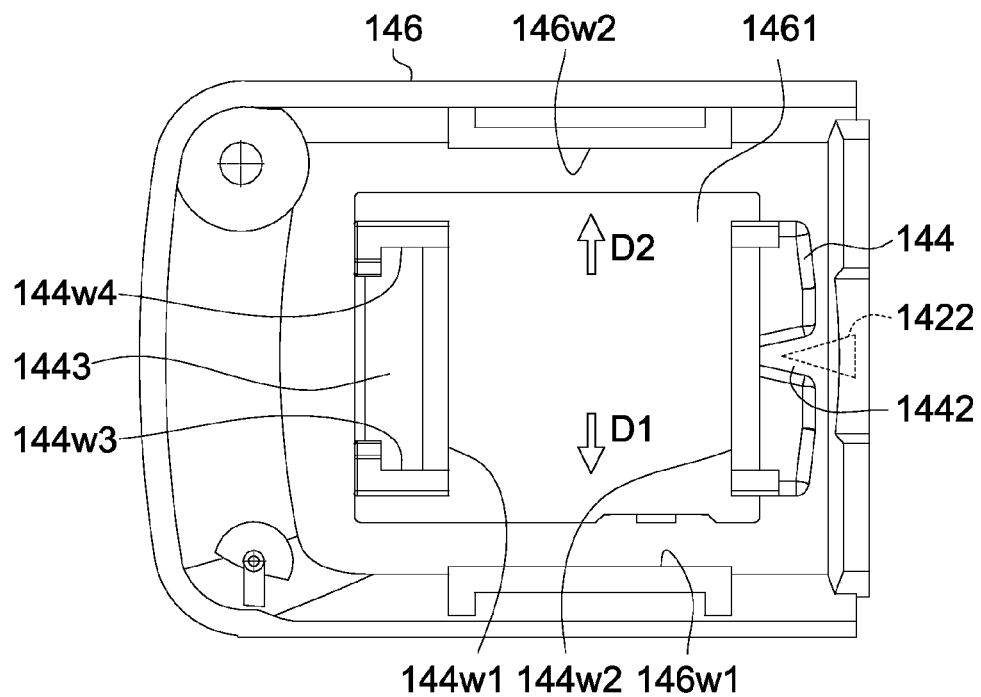
FIG. 8 is a bottom view of a slider and the cover of FIG. 2 being assembled to each other.

Referring to FIG. 8, a bottom view of the slider and a cover of FIG. 2 being assembled to each other is shown. The cover 146 has a first inner sidewall 146w1 and a second inner sidewall 146w2 disposed oppositely. In an embodiment, the slider 144 is restricted by the first inner sidewall 146w1 and the second inner sidewall 146w2, and only can move between the first inner sidewall 146w1 and the second inner sidewall 146w2. As a result, the cover 146 can prevent the slider 144 from being shifted too far to make the recess 1442 come off the lever 1422. Besides, the cover 146 further comprises an opening 1461. The slider 144 is exposed from the opening 1461 and is exposed from the cover 146 so that the slider 144 can be operated conveniently.

Figure 9:
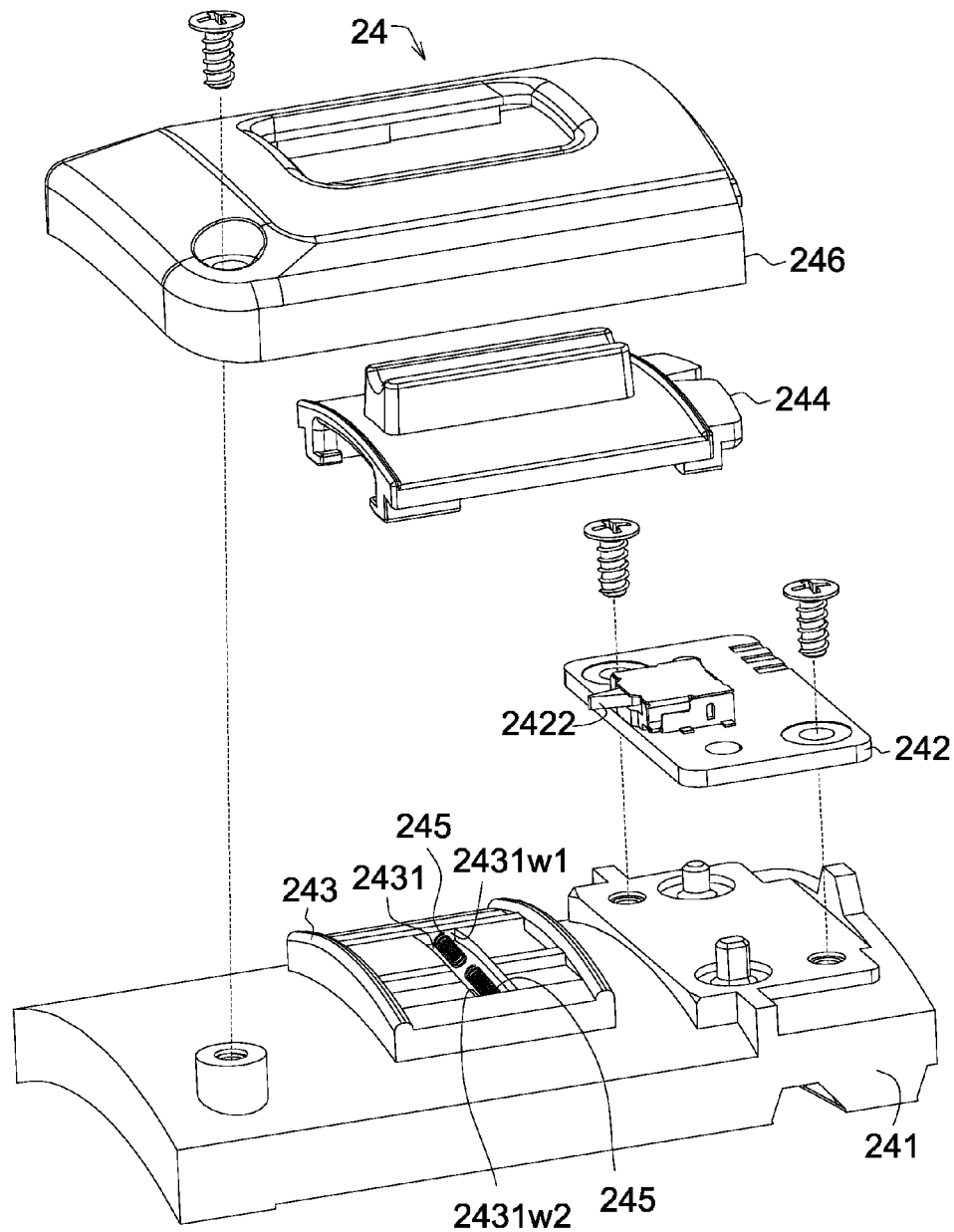
FIG. 9 is a schematic diagram of an operating device according to another embodiment of the invention.

Referring to FIG. 9, a schematic diagram of an operating device according to another embodiment of the invention is shown. The operating device 24 comprises a base 241, an electronic circuit board 242, a lever 2422, a slider 244, two second elastic members 245 and a cover 246. In the present embodiment of the invention, the assembly of the base 241, the electronic circuit board 242, the lever 2422, the slider 244, and the cover 246 are identical to the assembly of the base 141, the electronic circuit board 142, the lever 1422, the slider 144, and the cover 146 of the previous embodiment, and the identities are not repeated here.

In comparison to the previous embodiment, in the present embodiment of the invention, the two second elastic members 245 are assembled on the bearer 243 of the base 241. As indicated in FIG. 9, the bearer 243 has a receiving space 2431. The two second elastic members 245 are disposed on two opposite sidewalls 2431w1 and 2431w2 of the receiving space 2431 of the bearer 243 respectively.

Figure 10:
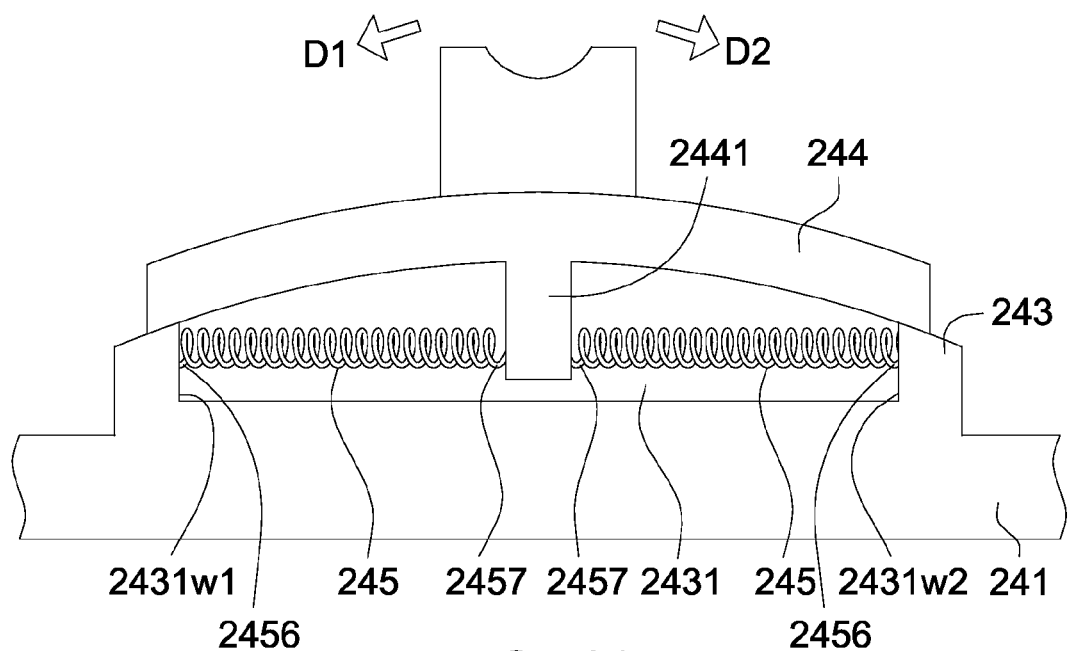
FIG. 10 is a partial cross-sectional view of a slider and a base of FIG. 9 being assembled to each other.

Referring to FIG. 10, a partial cross-sectional view of a slider and a base of FIG. 9 being assembled to each other is shown. The slider 244 comprises a peg 2441 disposed between the two second elastic members 245 and contacting the two second elastic members 245 respectively. When the slider 244 moves along the first direction D1, the peg 2441 drives the second elastic members 245 at the left side of FIG. 10 to deform so as to generate an elastic potential energy. When the slider 244 moves along the second direction D2, the peg 2441 drives the second elastic members 245 at the right side of FIG. 10 to deform so as to generate an elastic potential energy. Thus, when the slider 244 is released, the second elastic members 245 will release the elastic potential energy and drive the slider 244 to reverse to its initial position.

In the present example, only one of the two ends of the second elastic members 245 is fixed, and the other end can be a free end. For instance, the first end 2456 of the second elastic members 245 is fixed on the bearer 243, and the second end 2457 does not need to be fixed on the peg 2441. Or, the second end 2457 of the second elastic members 245 is fixed on the peg 2441 and the first end 2456 does not need to be fixed on the bearer 243. However, the first end 2456 can be fixed on the bearer 243.

In another example, one of the two second elastic members 245 can be omitted. For instance, only the second elastic member 245 at the left side of FIG. 10 is retained. In such a design, the two ends of the second elastic member 245 at the left side of FIG. 10 are fixed on the peg 2441 and the sidewall 2431w1 of the receiving space 2431. Conversely, it can be designed that only the second elastic member 245 at the right side of FIG. 10 is retained, and the assembly is identical to the design of the second elastic member 245 at the left side of FIG. 10.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operating device, comprising:
 a base comprising a bearer, the bearer disposed on a surface of the base and having a first side and a second side opposite to the first side;
 a slider comprising a groove, the groove opening towards the surface of the base and having a first groove sidewall and a second groove sidewall opposite to the first groove sidewall; and
 a lever disposed on the surface of the base and moving with the slider;
 wherein a gap between the first groove sidewall and the second groove sidewall is substantially the same as or slightly larger than a gap between the first side and the second side, and the slider is movably disposed on the bearer through the first groove sidewall moving along the first side and the second groove sidewall moving along the second side.

2. The operating device according to claim 1, further comprising an electronic circuit board disposed on the base and electrically connected to the lever.

3. The operating device according to claim 1, wherein the slider comprises a recess, and the lever is extended to and in the recess.

4. The operating device according to claim 1, wherein the operating device further comprises a first elastic member disposed on the base.

5. The operating device according to claim 4, wherein the first elastic member comprises at least one hole, the base further comprises a hook and at least one pin, the first elastic member is engaged with the hook, and the hole set onto the pin.

6. The operating device according to claim 1, further comprising two second elastic members disposed on the bearer.

7. The operating device according to claim 6, wherein the bearer comprises a receiving space, the slider comprises a peg, the second elastic members are respectively disposed in the receiving space, and the peg separates the second elastic members.

8. The operating device according to claim 1, further comprising a cover having an opening, wherein the slider is exposed from the opening and is movably disposed between two inner sidewalls of the cover.

9. An electronic device, comprising an operating device according to claim 1.

10. An operating device, comprising:
a base comprising a bearer and at least one pin;
a slider comprising a receiving space and movably disposed on the bearer;
a first elastic member comprising at least one hole, a first rod, a second rod, a connection rod connecting the first rod and the second rod, wherein the hole is set onto the pin, the first rod and the second rod are located inside and extend to the receiving space, and the connection rod is located outside of the receiving space;
a lever moving with the slider; and
an electronic circuit board fixed on the base and connected to the lever.

11. The operating device according to claim 10, wherein the base further comprises a hook, and the first elastic member engages the hook.

12. The operating device according to claim 10, wherein the slider comprises a recess, and the lever is disposed extended to and in the recess.

13. An electronic device comprising an operating device according to claim 10.

14. An operating device, comprising:
a base comprising a bearer with a receiving space;
a slider comprising a peg and a recess and movably disposed on the bearer;
two elastic members disposed within the receiving space of the bearer and contacting the peg respectively;
a lever linked to the slider and extended to and in the recess; and
an electronic circuit board disposed on the base and connected to the lever.

15. An electronic device comprising an operating device according to claim 14.

* * * * *